US009137835B2

(12) United States Patent
Sato et al.

(10) Patent No.: US 9,137,835 B2
(45) Date of Patent: Sep. 15, 2015

(54) COMMUNICATION APPARATUS, COMMUNICATION METHOD, AND COMMUNICATION SYSTEM

(75) Inventors: Masanori Sato, Tokyo (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 83 days.

(21) Appl. No.: 13/465,434

(22) Filed: May 7, 2012

(65) Prior Publication Data

US 2012/0311644 A1    Dec. 6, 2012

(30) Foreign Application Priority Data

Jun. 1, 2011  (JP) .................................. 2011-123375

(51) Int. Cl.
*H04N 7/18* (2006.01)
*G06F 3/00* (2006.01)
*H04B 7/00* (2006.01)
*H04W 76/02* (2009.01)
*H04N 7/52* (2011.01)
*H04N 21/43* (2011.01)
*H04N 21/242* (2011.01)

(52) U.S. Cl.
CPC .............. *H04W 76/023* (2013.01); *H04N 7/52* (2013.01); *H04N 21/242* (2013.01); *H04N 21/4302* (2013.01); *H04N 21/4307* (2013.01)

(58) Field of Classification Search
CPC ... H04N 7/52; H04N 21/242; H04N 21/4303; H04N 21/4302
See application file for complete search history.

(56) References Cited

U.S. PATENT DOCUMENTS

| 2008/0320539 | A1* | 12/2008 | Ohkita ......................... 725/118 |
| 2011/0286437 | A1* | 11/2011 | Austin et al. ................. 370/338 |
| 2011/0289545 | A1 | 11/2011 | Eguchi et al. |

FOREIGN PATENT DOCUMENTS

| JP | 2010-166481 A | 7/2010 |
| JP | 2010-166609 A | 7/2010 |
| JP | 2010-166610 A | 7/2010 |
| JP | 2010-166611 A | 7/2010 |
| JP | 2010-166612 A | 7/2010 |

OTHER PUBLICATIONS

Boppana et al., "Overlapped Carrier-Sense Multiple Access (OCSMA) in Wireless Ad Hoc Networks", IEEE Transactions on Mobile Computing, Mar. 2009.*
Sean Hollister, "Jawbone Jambox review", www.Engadget.com, Dec. 3, 2010.*

* cited by examiner

*Primary Examiner* — Nathan Flynn
*Assistant Examiner* — James R Marandi
(74) *Attorney, Agent, or Firm* — Hazuki International, LLC

(57) ABSTRACT

There is provided a communication apparatus including: a device detecting unit detecting devices capable of establishing a wireless connection; a user input unit selecting, based on a user operation, a combination of sync devices to carry out a pairing process out of a plurality of sync devices detected by the device detecting unit; a message transmitting unit transmitting an autosetup request message to one sync device out of the selected sync devices; a message receiving unit receiving an autosetup response message from a transmission destination of the autosetup request message; a wireless connection unit establishing a wireless connection with each of the selected sync devices; and a reproduction starting unit wirelessly transmitting, as a source device, data to be reproduced to each of the sync devices after establishment of the wireless connections.

17 Claims, 14 Drawing Sheets

FIG.3

| LIST OF DETECTED DEVICES | | | |
|---|---|---|---|
| NUMBER | NAME | TYPE | PAIRED STATE |
| 1 | TV | VIDEO REPRODUCTION SYNC DEVICE | NOT PAIRED |
| 2 | SPEAKER | AUDIO REPRODUCTION SYNC DEVICE | NOT PAIRED |

FIG.4

| LIST OF DETECTED DEVICES | | | |
|---|---|---|---|
| NUMBER | NAME | TYPE | PAIRED STATE |
| 1 | PC | SOURCE DEVICE | ....... |
| 2 | SPEAKER | AUDIO REPRODUCTION SYNC DEVICE | NOT PAIRED |

FIG.5

| LIST OF DETECTED DEVICES | | | |
|---|---|---|---|
| NUMBER | NAME | TYPE | PAIRED STATE |
| 1 | PC | SOURCE DEVICE | ・・・・・・・ |
| 2 | TV | VIDEO REPRODUCTION SYNC DEVICE | NOT PAIRED |

FIG.6

| LIST OF DETECTED DEVICES | | | | |
|---|---|---|---|---|
| NUMBER | NAME | TYPE | PAIRED STATE | SELECT |
| 1 | TV | VIDEO REPRODUCTION SYNC DEVICE | NOT PAIRED | ✓ |
| 2 | SPEAKER | AUDIO REPRODUCTION SYNC DEVICE | NOT PAIRED | ✓ |

CONNECTION START | CANCEL

FIG.8

| LIST OF DETECTED DEVICES | | | | |
|---|---|---|---|---|
| NUMBER | NAME | TYPE | PAIRED STATE | SELECT |
| 1 | PC | SOURCE DEVICE | ....... | ✓ |
| 2 | SPEAKER | AUDIO REPRODUCTION SYNC DEVICE | NOT PAIRED | ✓ |

CONNECTION START     CANCEL

FIG.10

| LIST OF DETECTED DEVICES | | | | |
|---|---|---|---|---|
| NUMBER | NAME | TYPE | PAIRED STATE | SELECT |
| 1 | PC | SOURCE DEVICE | ....... | ✓ |
| 2 | TV | VIDEO REPRODUCTION SYNC DEVICE | NOT PAIRED | ✓ |

CONNECTION START | CANCEL

COMMUNICATION APPARATUS, COMMUNICATION METHOD, AND COMMUNICATION SYSTEM

CROSS-REFERENCE TO RELATED APPLICATION

The present application claims priority from Japanese Patent Application No. JP 2011-123375 filed in the Japanese Patent Office on Jun. 1, 2011, the entire content of which is incorporated herein by reference.

BACKGROUND

The present disclosure relates to a communication apparatus and a communication method for operating as a source device simultaneously transmitting data to a plurality of sync devices that reproduce data, to a communication apparatus and a communication method for operating as a sync device that receives data transmitted from a source device and carries out a reproduction process, and to a communication system composed of one source device and a plurality of sync devices. In particular, the present disclosure relates to a communication apparatus and a communication method for operating as a source device and transmitting data to a plurality of sync devices that have been subjected to a pairing process, to a communication apparatus and a communication method for carrying out a pairing process with other sync devices and receiving and reproducing data transmitted from a source device, and to a communication system composed of one source device and a plurality of sync devices subjected to a pairing process.

Due to the spread of communication technology, data can now be transferred between devices such as personal computers (PCs) or the like using a wireless network such as a wireless LAN (Local Area Network). For wireless LAN technology, the main standards are IEEE 801.11 and the Wi-Fi Alliance. The technical specification of a wireless LAN is standardized according to IEEE802.11 and the Wi-Fi Alliance sets the method of testing for interoperability and certifies products.

Wireless LAN technology can be used in various applications. As one example, it is possible to use wireless LAN technology when video data and audio data are transmitted from one source device, such as a personal computer or a tuner device, respectively to two sync devices in the form of a video reproduction sync device (such as a TV set) with a video reproduction function and an audio reproduction sync device (such as a speaker) with an audio reproduction function.

Various applications of this technology have already been proposed. Japanese Laid-Open Patent Publication No. 2010-166481 discloses a sync device capable of determining, when reproducing AV (audio-video) data transferred wirelessly according to wireless multicast transmission from a source device, the wireless connection state of other sync devices that reproduce AV data from the same source device. Japanese Laid-Open Patent Publication No. 2010-166609 discloses a source device capable of transmitting, when AV data transferred wirelessly from the source device according to wireless multicast transmission is reproduced, sync device information on each sync device to enable the respective sync devices to determine the wireless connection states of the other sync devices that reproduce AV data from the same source device. Japanese Laid-Open Patent Publication Nos. 2010-166610 and 2010-166611 disclose a source device capable of transmitting, when AV data transferred wirelessly from the source device according to wireless multicast transmission is reproduced, sync device information to enable the respective sync devices to determine the wireless connection states of the other sync devices that reproduce AV data from the same source device. Japanese Laid-Open Patent Publication No. 2010-166612 discloses a sync device capable of determining, when AV data transferred wirelessly from a source device according to wireless multicast transmission is reproduced, the wireless connection state of other sync devices that reproduce AV data from the same source device and also a source device that transmits AV data to such sync device.

In a communication system composed of a source device that transmits AV data, a video reproduction sync device, and an audio reproduction sync device as described above, once the video reproduction sync device and the audio reproduction sync device have been subjected to a pairing process, during subsequent connecting operations, by merely selecting the video reproduction sync device, it is possible to have the corresponding audio reproduction sync device automatically selected. By doing so, in a case where the communication system is frequently used, it is possible to reduce the burden placed on the user. Normally, the pairing process for pairing sync devices together is carried out by the user operating the video reproduction sync device and the audio reproduction sync device.

To use a connection scheme with a source device that transmits AV data and a video reproduction sync device and an audio reproduction sync device, it is normally necessary for the user to carry out the operation described below, which is troublesome for the user.

(1) The user operates both the video reproduction sync device and the audio reproduction sync device to perform a pairing process for the two devices.
(2) The user operates both the source device and the video reproduction sync device to connect such devices.
(3) The user operates both the source device and the audio reproduction sync device to connect such devices.

SUMMARY

The present disclosure aims to provide a superior communication apparatus and communication method capable of operating as a source device, having a pairing process carried out by a plurality of sync devices according to a simple user operation, and transmitting data.

The present disclosure also aims to provide a superior communication apparatus and communication method capable of operating as a sync device, carrying out a pairing process with another sync device according to a simple user operation, and receiving and reproducing data transmitted from a source device.

The present disclosure also aims to provide a superior communication system that is composed of a single source device and a plurality of sync devices that carry out a pairing process, and is capable of having the pairing process carried out between the plurality of sync devices according to a simple user operation and having data transmitted between the source device and the plurality of sync devices.

According to an embodiment of the present disclosure, there is provided a communication apparatus which includes a device detecting unit detecting devices capable of establishing a wireless connection, a user input unit selecting, based on a user operation, a combination of sync devices to carry out a pairing process out of a plurality of sync devices detected by the device detecting unit, a message transmitting unit transmitting an autosetup request message to one sync device out of the selected sync devices, a message receiving unit receiving an autosetup response message from a transmission destination of the autosetup request message, a wireless connection unit establishing a wireless connection with each of the selected sync devices, and a reproduction starting unit wirelessly transmitting, as a source device, data to be reproduced to each of the sync devices after establishment of the wireless connections.

The plurality of sync devices include a video reproduction sync device equipped with a reproduction function for video data and an audio reproduction sync device equipped with a reproduction function for audio data, the message transmitting unit transmits the autosetup request message to the video reproduction sync device out of the video reproduction sync device and the audio reproduction sync device selected as the combination of devices to carry out the pairing process, and the reproduction starting unit wirelessly transmits video data and audio data to the video reproduction sync device and the audio reproduction sync device, respectively.

The autosetup request message includes identification information on the present communication device operating as the source device and on the selected sync devices.

The autosetup request message and the autosetup response message each include an expected time within which a transmitter of the message expects to complete establishment of a wireless connection, the communication apparatus further includes a timer setting unit setting a timer based on the expected times written in the autosetup request message and the autosetup response message, and the user input unit is operable when the timer has timed out, to cancel the combination of sync devices to carry out a pairing process that were selected based on the user operation.

According to another embodiment of the present disclosure, there is provided a communication method which includes detecting devices capable of establishing a wireless connection, selecting, based on a user operation, a combination of sync devices to carry out a pairing process out of a plurality of detected sync devices, transmitting an autosetup request message to one sync device out of the selected sync devices, receiving an autosetup response message from a transmission destination of the autosetup request message, establishing a wireless connection with each of the selected sync devices, and wirelessly transmitting, as a source device, data to be reproduced to each of the sync devices after establishment of the wireless connections.

According to another embodiment of the present disclosure, there is provided a communication apparatus which includes a device detecting unit detecting devices capable of establishing a wireless connection, a user input unit selecting, based on a user operation, a source device that is a supplier of data and a sync device to be paired with the communication apparatus out of a plurality of devices detected by the device detecting unit, a message transmitting unit transmitting an autosetup request message to the selected source device, a message receiving unit receiving an autosetup response message from the source device to which the autosetup request message was transmitted, a pairing processing unit carrying out a pairing process with the selected sync device to be paired with the communication apparatus, a wireless connection unit establishing a wireless connection with the selected source device, and a reproduction starting unit receiving, as a sync device, data from the selected source device after establishment of the wireless connection and carrying out a reproduction process.

The communication apparatus is a video reproduction sync device equipped with a reproduction function for video data and the sync device to be paired with the communication apparatus is an audio reproduction sync device equipped with a reproduction function for audio data, and the reproduction starting unit receives video data from the source device and carries out the reproduction process.

The autosetup request message includes identification information on the source device, on the present communication device operating as a sync device, and on the selected sync device to be paired with the communication apparatus.

The autosetup request message and the autosetup response message each include an expected time within which a transmitter of the message expects to complete establishment of a wireless connection.

The pairing processing unit requests establishment of a wireless connection with the selected sync device to be paired with the communication apparatus and exchanges information used for pairing via the wireless connection before storing a paired state with the selected sync device to be paired with the communication apparatus.

According to another embodiment of the present disclosure, there is provided a communication method which includes detecting devices capable of establishing a wireless connection, selecting, based on a user operation, a source device that is a supplier of data and a sync device to be paired with out of a plurality of detected devices, transmitting an autosetup request message to the selected source device, receiving an autosetup response message from the source device to which the autosetup request message was transmitted, carrying out a pairing process with the selected sync device to be paired with, establishing a wireless connection with the selected source device, and receiving, as a sync device, data from the selected source device after establishment of the wireless connection and carrying out a reproduction process.

According to another embodiment of the present disclosure, there is provided a communication apparatus which includes a device detecting unit detecting devices capable of establishing a wireless connection, an autosetup request message receiving unit receiving, from one of a source device and another device that operates as a sync device out of a plurality of devices detected by the device detecting unit, an autosetup request message including identification information on the source device and on the present communication apparatus and the other device that operate as sync devices, an autosetup response message transmitting unit transmitting an autosetup request message to the other device, a pairing processing unit carrying out a pairing process with the other device, a wireless connection unit establishing a wireless connection with the source device identified from the identification information included in the autosetup request message, and a reproduction starting unit receiving data from the selected source device after establishment of the wireless connection and carrying out a reproduction process.

The communication apparatus is a video reproduction sync device equipped with a reproduction function for video data and the other device is an audio reproduction sync device equipped with a reproduction function for audio data, and the reproduction starting unit receives video data from the source device and carries out the reproduction process.

The pairing processing unit requests the other sync device to establish a wireless connection in response to reception of the autosetup request message from the other sync device, exchanges information used for pairing via the wireless connection, and then stores a paired state with the other device.

According to another embodiment of the present disclosure, there is provided a communication apparatus which includes a device detecting unit detecting devices capable of establishing a wireless connection, a user input unit selecting, based on a user operation, a source device that is a supplier of data and a sync device to be paired with the communication apparatus out of a plurality of devices detected by the device detecting unit, a message transmitting unit transmitting an autosetup request message to each of the selected source device and the sync device to be paired with the communication apparatus, a message receiving unit receiving an autosetup response message from each of the selected source device and the sync device to be paired with the communication apparatus to which the autosetup request message was transmitted, a pairing processing unit carrying out a pairing process with the selected sync device to be paired with the communication apparatus, a wireless connection unit establishing a wireless connection with the selected source device, and a reproduction starting unit receiving, as a sync device, data from the selected source device after establishment of the wireless connection and carrying out a reproduction process.

The communication apparatus is an audio reproduction sync device equipped with a reproduction function for audio data and the sync device to be paired with the communication apparatus is a video reproduction sync device equipped with a reproduction function for video data, and the reproduction starting unit receives audio data from the source device and carries out the reproduction process.

The autosetup request message includes identification information on the source device, on the present communication device operating as a sync device, and on the selected sync device to be paired with the communication apparatus.

The autosetup request message and the autosetup response message each include an expected time within which a transmitter of the message expects to complete establishment of a wireless connection.

The pairing processing unit receives a wireless connection request from the sync device to which the autosetup request message was transmitted, exchanges information used for pairing via the wireless connection, and then stores a paired state with the sync device to be paired with the communication apparatus.

According to another embodiment of the present disclosure, there is provided a communication method which includes detecting devices capable of establishing a wireless connection, selecting, based on a user operation, a source device that is a supplier of data and a sync device to be paired with out of a plurality of devices that have been detected, transmitting an autosetup request message to each of the selected source device and the sync device to be paired with, receiving an autosetup response message from each of the source device and the sync device to be paired with to which the autosetup request message was transmitted, carrying out a pairing process with the selected sync device to be paired with, establishing a wireless connection with the selected source device, and receiving, as a sync device, data from the selected source device after establishment of the wireless connection and carrying out a reproduction process.

According to another embodiment of the present disclosure, there is provided a communication system which includes a source device supplying data, and a plurality of sync devices reproducing data received from the source device. After a pairing process for the plurality of sync devices and establishment of wireless connections between the source device and each of the plurality of sync devices based on a user operation at one device out of the source device and the plurality of sync devices, data is transmitted from the source device to each of the plurality of sync devices and reproduction of the data by the plurality of sync devices starts.

Here, the expression "system" refers to a logical grouping of a plurality of apparatuses (and/or functional modules that realize specified functions), and does not depend on such apparatuses and/or functional modules being present inside a single housing. Also, here the term "sync device" or "sync devices" may be considered as referring to "sink device" or "sink devices", respectively.

According to the embodiments of the present disclosure described above, it is possible to provide a superior communication apparatus and communication method capable of operating as a source device, having a pairing process carried out by a plurality of sync devices according to a simple user operation, and transmitting data.

According to the embodiments of the present disclosure described above, it is also possible to provide a superior communication apparatus and communication method capable of operating as a sync device, carrying out a pairing process with another sync device according to a simple user operation, and receiving and reproducing data transmitted from a source device.

According to the embodiments of the present disclosure described above, it is also possible to provide a superior communication system that is composed of a single source device and a plurality of sync devices that carry out a pairing process, and is capable of having the pairing process carried out between the plurality of sync devices according to a simple user operation and having data transmitted between the source device and the plurality of sync devices.

According to the embodiments of the present disclosure described above, it is possible, in a communication system composed of a single source device and a plurality of sync devices, to connect the source device and the respective sync devices by operating one of such devices. It is also possible to have the pairing process for the plurality of sync devices carried out automatically and to grasp the time until the system can be used.

Other objects, features, and advantages of the technology according to the present disclosure should be apparent from the following detailed description of the embodiments and the appended drawings.

BRIEF DESCRIPTION OF THE DRAWINGS

FIG. 3 is a diagram showing an example display of detection results obtained by transmitting a probe request from a source device;

FIG. 4 is a diagram showing an example display of detection results obtained by transmitting a probe request from a video reproduction sync device;

FIG. 5 is a diagram showing an example display of detection results obtained by transmitting a probe request from an audio reproduction sync device;

FIG. 6 is a diagram showing an example configuration of a UI screen displayed on the source device for starting autosetup from the source device;

FIG. 8 is a diagram showing an example configuration of a UI screen displayed on the video reproduction sync device for starting autosetup from the video reproduction sync device;

FIG. 10 is a diagram showing an example configuration of a UI screen displayed on the audio reproduction sync device for starting autosetup from the audio reproduction sync device;

DETAILED DESCRIPTION OF THE EMBODIMENT(S)

Figure 1:
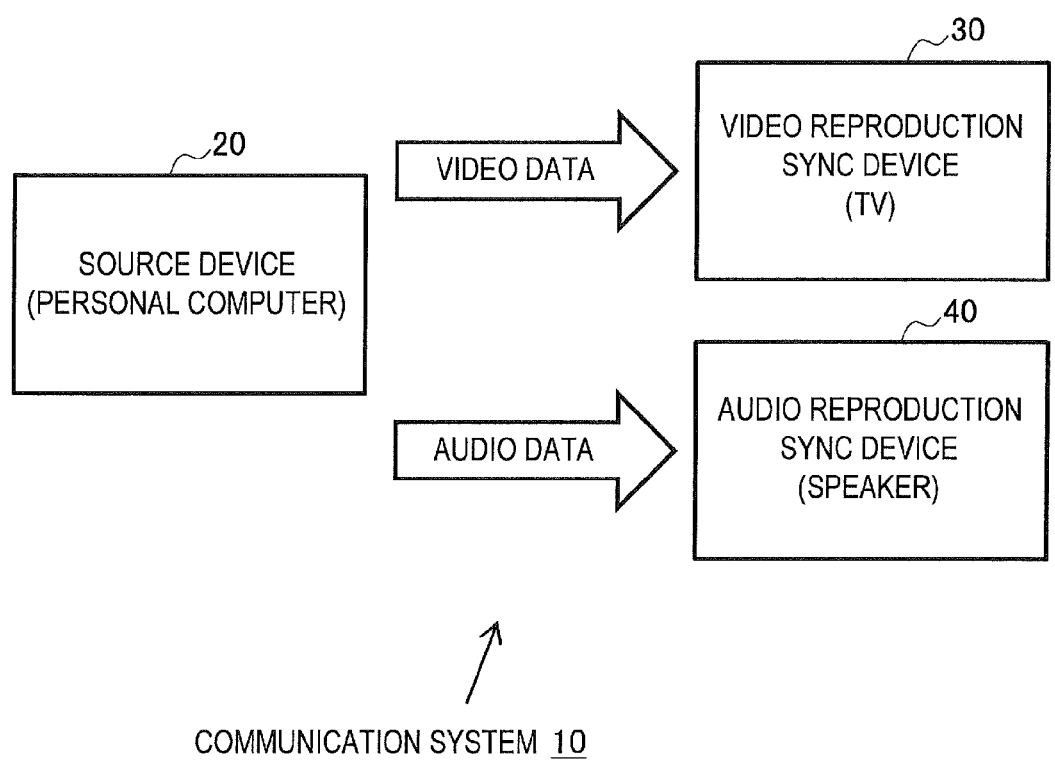
FIG. 1 is a diagram schematically showing the configuration of a communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

FIG. 1 schematically shows the configuration of a communication system to according to an embodiment of the present disclosure. The communication system 10 shown in FIG. 1 includes a single source device 20 that transmits video data and audio data, a video reproduction sync device 30 that receives video data transmitted from the source device 20 and reproduces video, and an audio reproduction sync device 40 that receives audio data transmitted from the source device 20 and reproduces audio.

The source device 20, the video reproduction sync device 30, and the audio reproduction sync device 40 are wirelessly connected using Wi-Fi Direct technology, for example. The communication system 10 shown in FIG. 1 is a star network centered on the source device 20. The video reproduction sync device 30 and the audio reproduction sync device 40 have already performed the pairing process before establishment of the connection scheme shown in FIG. 1, and therefore when video data and audio data are transmitted, the video reproduction sync device 30 and the audio reproduction sync device 40 are not wirelessly connected.

Here, as examples, the source device 20 is a personal computer (PC) on which AV data composed of video and audio is recorded (or which reads AV data from a recording medium) or a tuner that receives AV data. The video reproduction sync device 30 is a television set with a video display function and the audio reproduction sync device 40 is a speaker or the like with an audio output function. For the communication system 10, a case is assumed where there is one source device 20 and one video reproduction sync device 30. However, it is also possible for the audio data to be multichannel data, and a plurality of audio reproduction sync devices 40 may be present. Also, although not illustrated, in a case where the source device 20 simultaneously outputs other types of data aside from video and audio, sync devices that reproduce such types of data may also be present.

Figure 2:
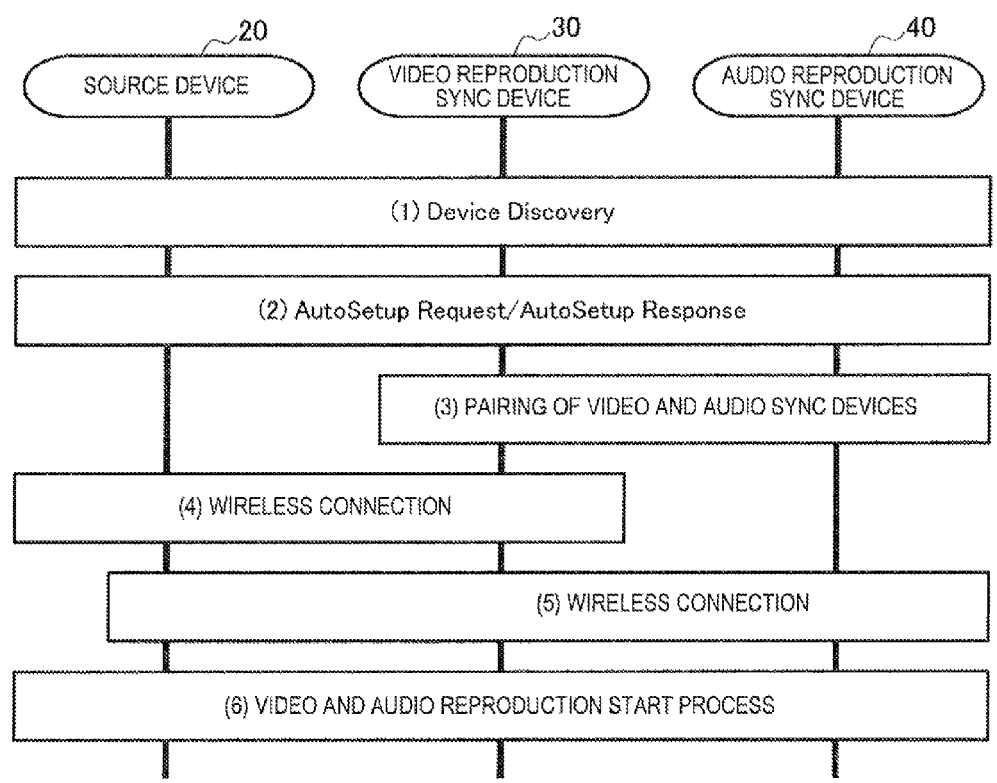
FIG. 2 is a sequence chart showing the processing procedure carried out to reproduce video and audio in the communication system shown in FIG. 1.

FIG. 2 shows the processing procedure carried out to reproduce video and audio in the communication system 10 shown in FIG. 1. As shown in FIG. 2, the processes carried out in the communication system 10 are classified into "(1) Device Discovery", "(2) AutoSetup Request/AutoSetup Response", "(3) Pairing of Video and Audio Reproduction Sync Devices", "(4) Wireless Connection (Between Source Device and Video Reproduction Sync Device)", "(5) Wireless Connection (Between Source Device and Audio Reproduction Sync Device)", and "(6) Video and Audio Reproduction Start Process".

"Device discovery" is a process where the source device 20, the video reproduction sync device 30, and the audio reproduction sync device 40 detect one another as wireless devices. As one example, the specific processing can be realized according to the rules of Wi-Fi Direct technology.

"Autosetup request/autosetup response" is a process for automating the "pairing of video and audio reproduction sync devices", "wireless connection (between sync device and video reproduction sync device)", and "wireless connection (between sync device and audio reproduction sync device)", and is carried out by the device operated by the user making a request ("autosetup request") to other devices. In the present embodiment, it is assumed that any of the source device 20, the video reproduction sync device 30, and the audio reproduction sync device 40 can be operated by the user.

The "pairing of video and audio reproduction sync devices" is a process that links the video reproduction sync device 30 and the audio reproduction sync device 40 so as to simultaneously carry out reproduction processes for video data and audio data transmitted from the same source device 20. Once the video reproduction sync device 30 and the audio reproduction sync device 40 have carried out the pairing process, in subsequent connection operations it is possible, by merely selecting the video reproduction sync device 30, to have the corresponding audio reproduction sync device 40 automatically selected.

The "wireless connection (between sync device and video reproduction sync device)" and "wireless connection (between sync device and audio reproduction sync device)" are processes that establish wireless connections between devices using Wi-Fi Direct technology. In the present specification, detailed description of the establishment of wireless connections is omitted.

In the "video and audio reproduction start process", transmission of video data and audio data from the source device 20 to the video reproduction sync device 30 and the audio reproduction sync device 40 respectively is commenced. In the present specification, detailed description of the video and audio reproduction start process is omitted.

First, device discovery will be described in detail. As mentioned above, device discovery can be realized according to the rules of Wi-Fi Direct technology. More specifically, a probe request and a probe response are exchanged between the devices to exchange information on the respective devices. By doing so, the respective devices 20, 30, 40 are capable of detecting one another. The probe request and the probe response also exchange information showing whether a sync device is in a paired state with another sync device.

FIG. 3 shows an example of detection results obtained by transmitting the probe request from the source device 20. In the communication system 10 shown in FIG. 1, when a probe request has been transmitted from the source device 20, probe responses are sent in reply from the video reproduction sync device 30 and the audio reproduction sync device 40 respectively, making it possible to detect information on the devices 30 and 40. In the display example shown in FIG. 3, the names, information on types and the like, and the pairing state are displayed for the devices 30 and 40. Note that although only one device of each of the video reproduction sync device and audio reproduction sync device types is shown in FIG. 3 to simplify the drawing, if multiple devices of either type are detected by device discovery, all of such devices are listed up.

FIG. 4 shows an example display of detection results obtained by transmitting a probe request from the video reproduction sync device 30. In the communication system 10 shown in FIG. 1, when a probe request has been transmitted from the video reproduction sync device 30, probe responses are sent in reply from the source device 20 and the audio reproduction sync device 40, making it possible to detect information on the devices 20 and 40. In the display example shown in FIG. 4, the names, information on types and the like, and the pairing state are displayed for the devices 20 and 40 (since the source device 20 is not in a paired state, the column is blank). Note that although only one device of each of the source device and audio reproduction sync device types is shown in FIG. 4 to simplify the drawing, if multiple devices of either type are detected by device discovery, all of such devices are listed up.

FIG. 5 shows an example display of detection results obtained by transmitting a probe request from the audio reproduction sync device 40. In the communication system 10 shown in FIG. 1, when a probe request has been transmitted from the audio reproduction sync device 40, probe responses are sent in reply from the source device 20 and the video reproduction sync device 30, making it possible to detect information on the devices 20 and 30. In the display example shown in FIG. 5, the names, information on types and the like, and the pairing state are displayed for the devices 20 and 30 (since the source device 20 is not in a paired state, the column is blank). Note that although only one device of each of the source device and video reproduction sync device types is shown in FIG. 5 to simplify the drawing, if multiple devices of either type are detected by device discovery, all of such devices are listed up.

Next, the auto setup request/auto setup response process will be described. By making an auto setup request from the device being operated by the user to another device, it is possible to automate the "pairing of video and audio reproduction sync devices", "wireless connection (between sync device and video reproduction sync device)", and "wireless connection (between sync device and audio reproduction sync device)" processes.

If the user is operating the source device 20, detection results like those shown in FIG. 3 obtained from probe responses to the probe request are displayed on the source device 20.

On the source device 20, based on the results of device discovery shown in FIG. 3, a UI (user interface) screen such as that shown in FIG. 6 is displayed in order to start an autosetup request. Checkboxes for selecting the video reproduction sync device and the audio reproduction sync device that are to be paired as transmission destinations of the video data and the audio data from the source device 20 and a "connection start" button for indicating the start of autosetup are disposed in the illustrated UI screen. After adding checks to the checkboxes of the desired video reproduction sync device and audio reproduction sync device, the user presses the "connection start" button. By doing so, autosetup is started.

Figure 7:
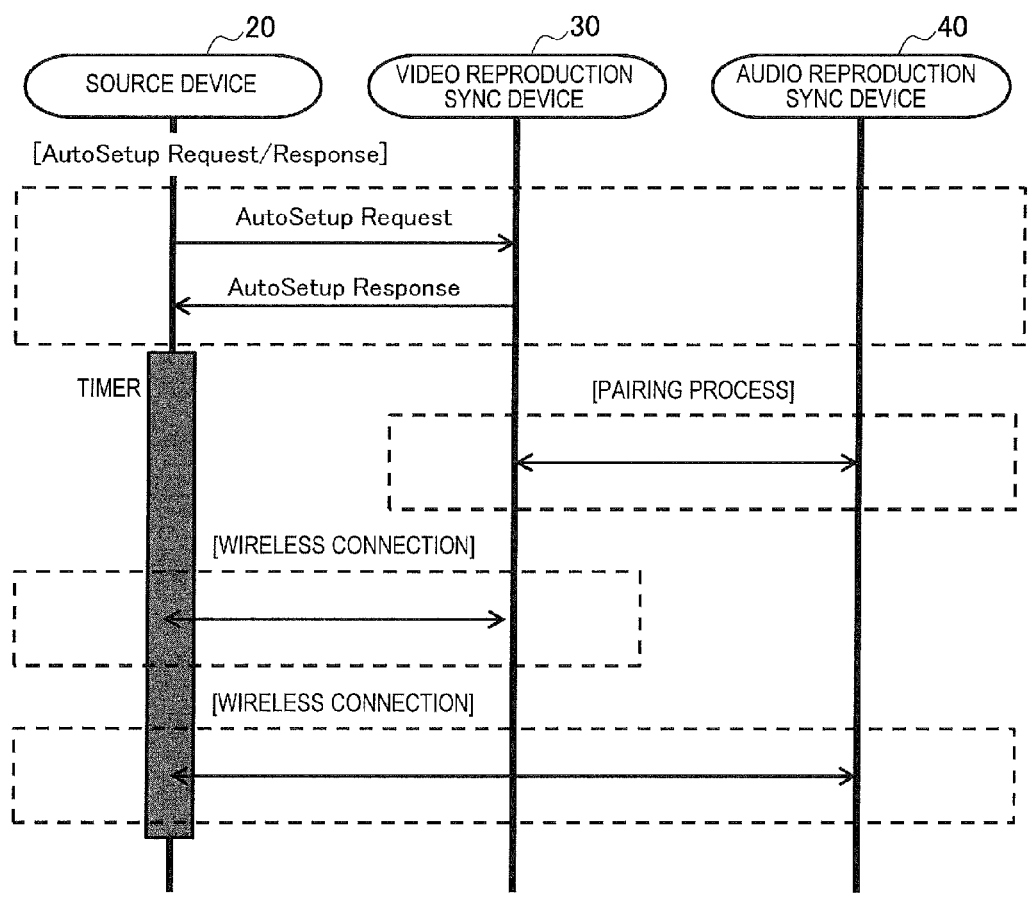
FIG. 7 is a sequence chart showing the processing procedure for carrying out various processes in response to autosetup having been requested from the source device.

FIG. 7 shows the processing procedure for carrying out the "pairing of video and audio reproduction sync devices", "wireless connection (between sync device and video reproduction sync device)", and "wireless connection (between sync device and audio reproduction sync device)" processes in response to autosetup being requested from the source device 20.

First, an autosetup request message is transmitted from the source device 20 and in response to this, an autosetup response message is sent in reply from the video reproduction sync device 30. At this time, the source device 20 sets a timer that waits for the establishment of a wireless connection between the video reproduction sync device and the audio reproduction sync device. Here, the source device 20 sets the timer that waits for establishment of a wireless connection at the longer time out of the expected times written in the autosetup request and autosetup response messages.

The video reproduction sync device 30 responds to the autosetup request message and carries out a process for pairing with the audio reproduction sync device 40. Although two types of sync devices, that is, the video reproduction sync device and the audio reproduction sync device are present in the communication system 10 shown in FIG. 1, it is assumed that the pairing process is usually carried out by the video reproduction sync device (this also applies to the following description).

After this, the source device 20 establishes a wireless connection with the audio reproduction sync device 40 and also establishes a wireless connection with the video reproduction sync device 30. Establishment of the wireless connection is realized using Wi-Fi Direct technology, for example. As a result, in the communication system 10, a star network like that shown in FIG. 1 centered on the source device 20 is formed, and the video reproduction sync device 30 and the audio reproduction sync device 40 are not wirelessly connected.

Also, if the user is operating the video reproduction sync device 30, detection results like those shown in FIG. 4 obtained from probe responses to the probe request are displayed on the video reproduction sync device 30.

On the video reproduction sync device 30, based on the results of device discovery shown in FIG. 4, a UI (user interface) screen such as that shown in FIG. 8 is displayed in order to start an autosetup request. Checkboxes for selecting the source device that is the transmission source of video data and the audio reproduction sync device that is to be paired as a transmission destination of the video data and audio data from the source device 20 and a "connection start" button for indicating the start of autosetup are disposed in the illustrated UI screen. After adding checks to the checkboxes of the desired source device and audio reproduction sync device, the user presses the "connection start" button. By doing so, autosetup is started.

Figure 9:
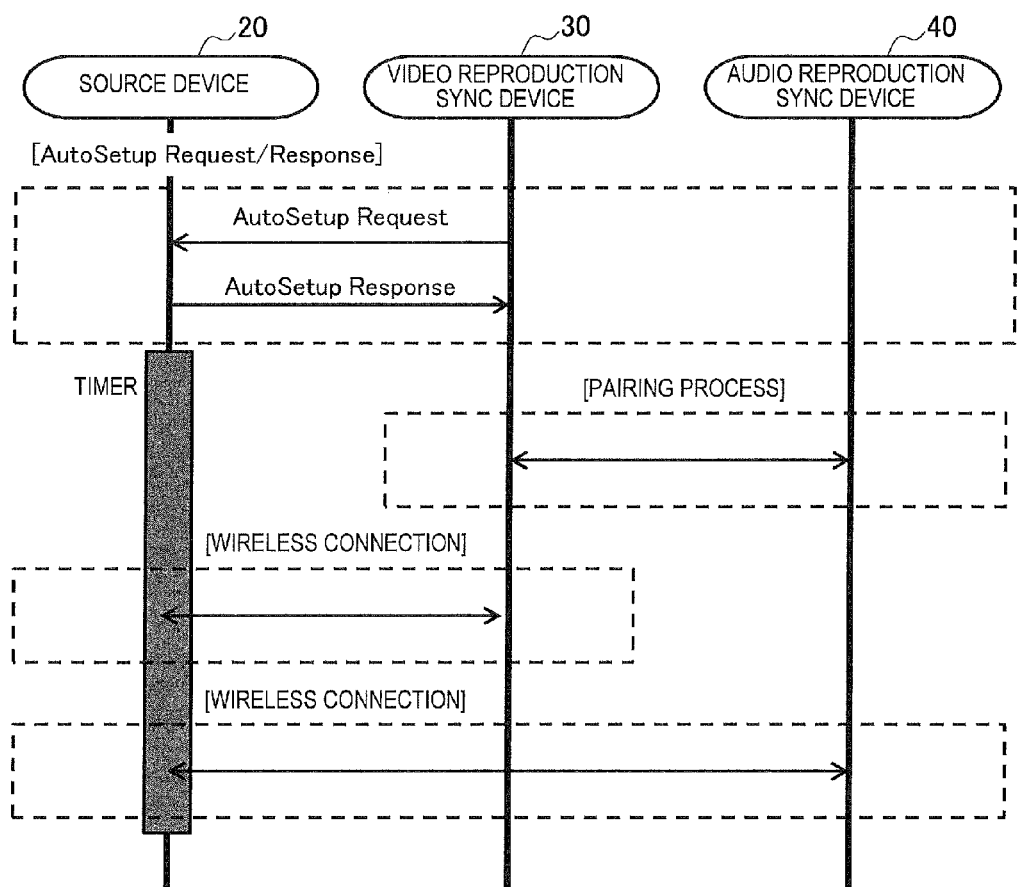
FIG. 9 is a sequence chart showing the processing procedure for carrying out various processes in response to autosetup having been requested from the video reproduction sync device.

FIG. 9 shows the processing procedure for carrying out the "pairing of video and audio reproduction sync devices", "wireless connection (between sync device and video reproduction sync device)", and "wireless connection (between sync device and audio reproduction sync device)" processes in response to autosetup being requested from the video reproduction sync device 30.

First, an autosetup request message is transmitted from the video reproduction sync device 30 to the source device 20 and in response to this, an autosetup response message is sent in reply from the source device 20. The source device 20 also sets a timer that waits for establishment of a wireless connection between the video reproduction sync device and the audio reproduction sync device. Here, the source device 20 sets the timer that waits for establishment of a wireless connection at the longer time out of the expected times written in the autosetup request and autosetup response messages.

After this, the video reproduction sync device 30 carries out a process for pairing with the audio reproduction sync device 40.

Next, the source device 20 establishes a wireless connection with the video reproduction sync device 30 and also establishes a wireless connection with the audio reproduction sync device 40. Establishment of the wireless connections is realized using Wi-Fi Direct technology, for example. As a result, in the communication system 10, a star network like that shown in FIG. 1 centered on the source device 20 is formed, and the video reproduction sync device 30 and the audio reproduction sync device 40 are not wirelessly connected.

If the user is operating the audio reproduction sync device 40, detection results like those shown in FIG. 5 obtained from probe responses to the probe request are displayed on the audio reproduction sync device 40.

On the audio reproduction sync device 40, based on the results of device discovery shown in FIG. 5, a UI (user interface) screen such as that shown in FIG. 10 is displayed in order to start an autosetup request. Checkboxes for selecting the source device that is the transmission source of audio data and the video reproduction sync device that is to be paired as a transmission destination of the video data and audio data from the source device 20 and a "connection start" button for indicating the start of autosetup are disposed in the illustrated UI screen. After adding checks to the checkboxes of the desired source device and video reproduction sync device, the user presses the "connection start" button. By doing so, autosetup is started.

Figure 11:
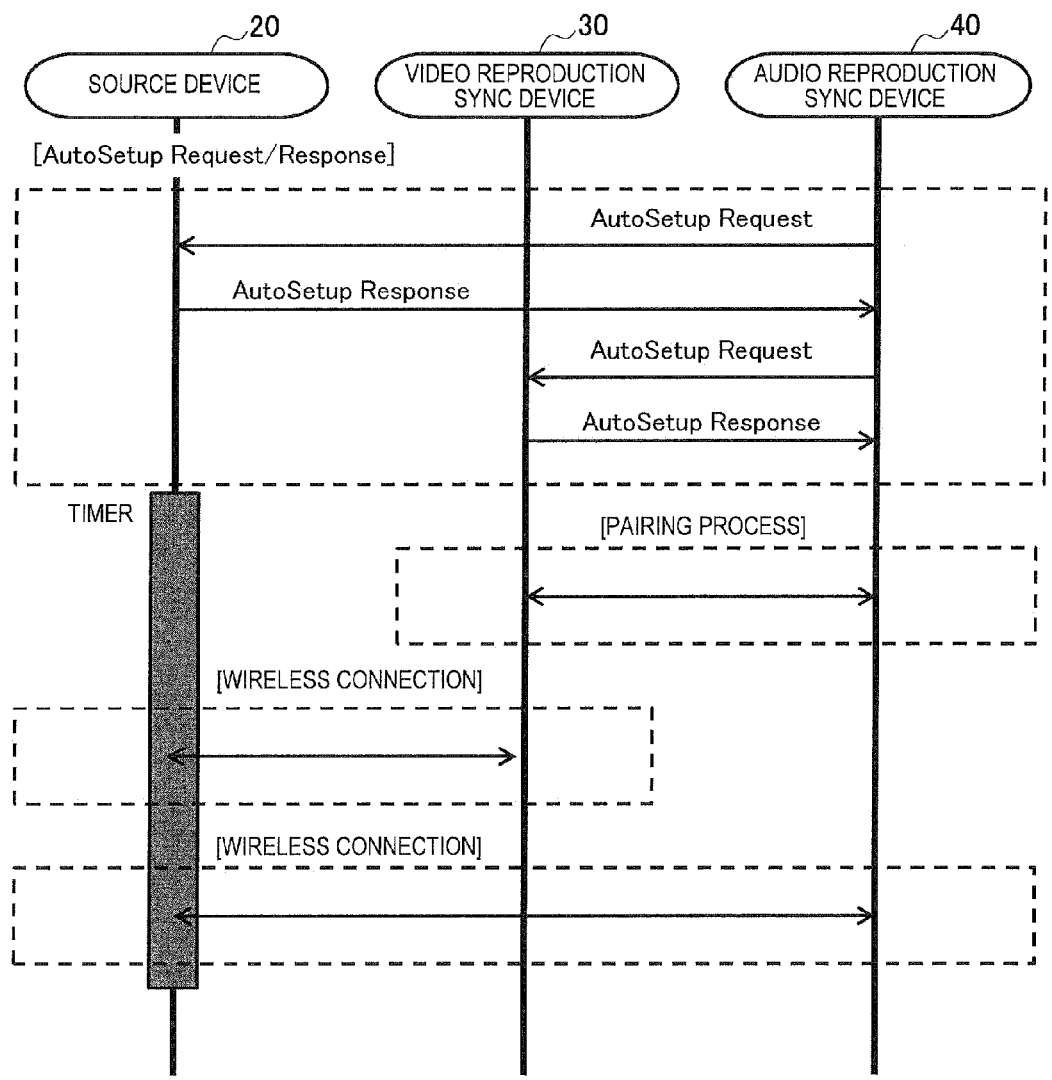
FIG. 11 is a sequence chart showing the processing procedure for carrying out various processes in response to autosetup having been requested from the audio reproduction sync device.

FIG. 11 shows the processing procedure for carrying out the "pairing of video and audio reproduction sync devices", "wireless connection (between sync device and video reproduction sync device)", and "wireless connection (between sync device and audio reproduction sync device)" processes in response to autosetup being requested from the audio reproduction sync device 40.

First, an autosetup request message is transmitted from the audio reproduction sync device 40 to the source device 20 and in response to this, an autosetup response message is sent in reply from the source device 20. The source device 20 also sets a timer that waits for establishment of a wireless connection between the video reproduction sync device and the audio reproduction sync device. Here, the source device 20 sets the timer that waits for establishment of a wireless connection for the longer time out of the expected times written in the autosetup request and autosetup response messages.

After this, an autosetup request message is transmitted from the audio reproduction sync device 40 to the video reproduction sync device 30 and in response, an autosetup response message is sent in reply from the video reproduction sync device 30.

The video reproduction sync device 30 replies to the reception of the autosetup request and carries out a process for pairing with the audio reproduction sync device 40.

Next, the source device 20 establishes a wireless connection with the video reproduction sync device 30 and also establishes a wireless connection with the audio reproduction sync device 40. Establishment of the wireless connections is realized using Wi-Fi Direct technology, for example. As a result, in the communication system 10, a star network like that shown in FIG. 1 centered on the source device 20 is formed, and the video reproduction sync device 30 and the audio reproduction sync device 40 are not wirelessly connected.

A specific example configuration of the information included in an autosetup request message is shown below.
 (1) Identification information showing that the message is an autosetup request.
 (2) Information specifying the source device (for example, the MAC address of the source device).
 (3) Information specifying the video reproduction sync device (for example, the MAC address of the video reproduction sync device).
 (4) Information specifying the audio reproduction sync device (for example, the MAC address of the audio reproduction sync device).
 (5) The time expected at the transmission side until the completion of establishment of a wireless connection.

A specific example configuration of the information included in an autosetup response message is shown below.
 (1) Identification information showing that the message is an autosetup response.
 (2) Status information showing whether a request has been received.
 (3) The time expected at the reception side until the completion of establishment of a wireless connection.

Figure 12A:
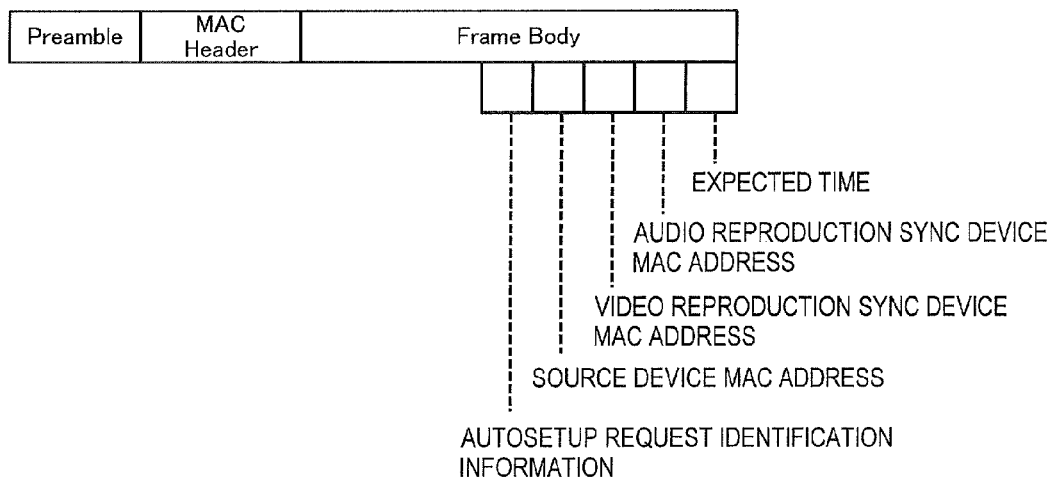
FIG. 12A is a diagram showing the specific frame configuration of an autosetup request.
Figure 12B:
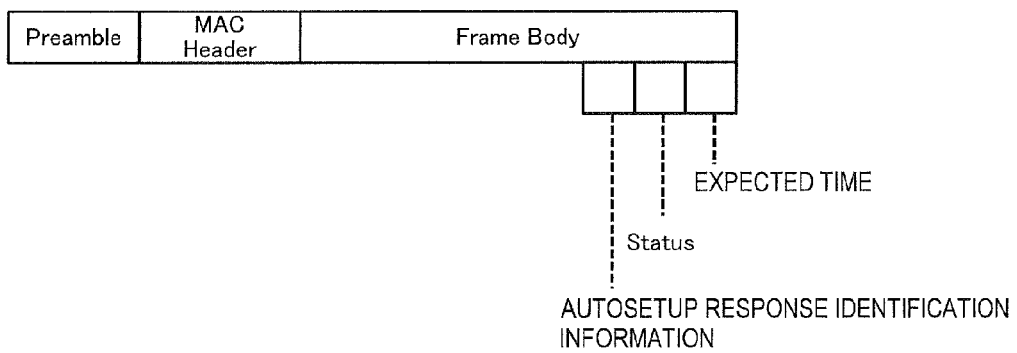
FIG. 12B is a diagram showing the specific frame configuration of an autosetup response.

FIG. 12A shows a specific frame configuration of an autosetup request. FIG. 12B shows a specific frame configuration of an autosetup response. In these drawings, a pattern for synchronization as a wireless signal is written in the preamble. Information such as the transmission source and the transmission destination as a wireless signal is written in a MAC header. Such information is added to a frame body part.

The source device 20 sets a timer that waits for a wireless connection to be established at the longer time out of the expected times written in the autosetup request and autosetup response messages. When the establishment of a wireless connection has not succeeded within such time, it is determined that a problem has occurred and the source device 20 returns to the state before the start of autosetup. By setting the timer, the source device 20 is capable of adjusting in advance the time until the series of processes ends.

When autosetup has been completed, as shown in FIG. 7, FIG. 9, and FIG. 11, the video reproduction sync device 30 starts the pairing process with the selected audio reproduction sync device 40. The pairing process is carried out via a wireless connection using Wi-Fi Direct technology, for example.

Figure 13:
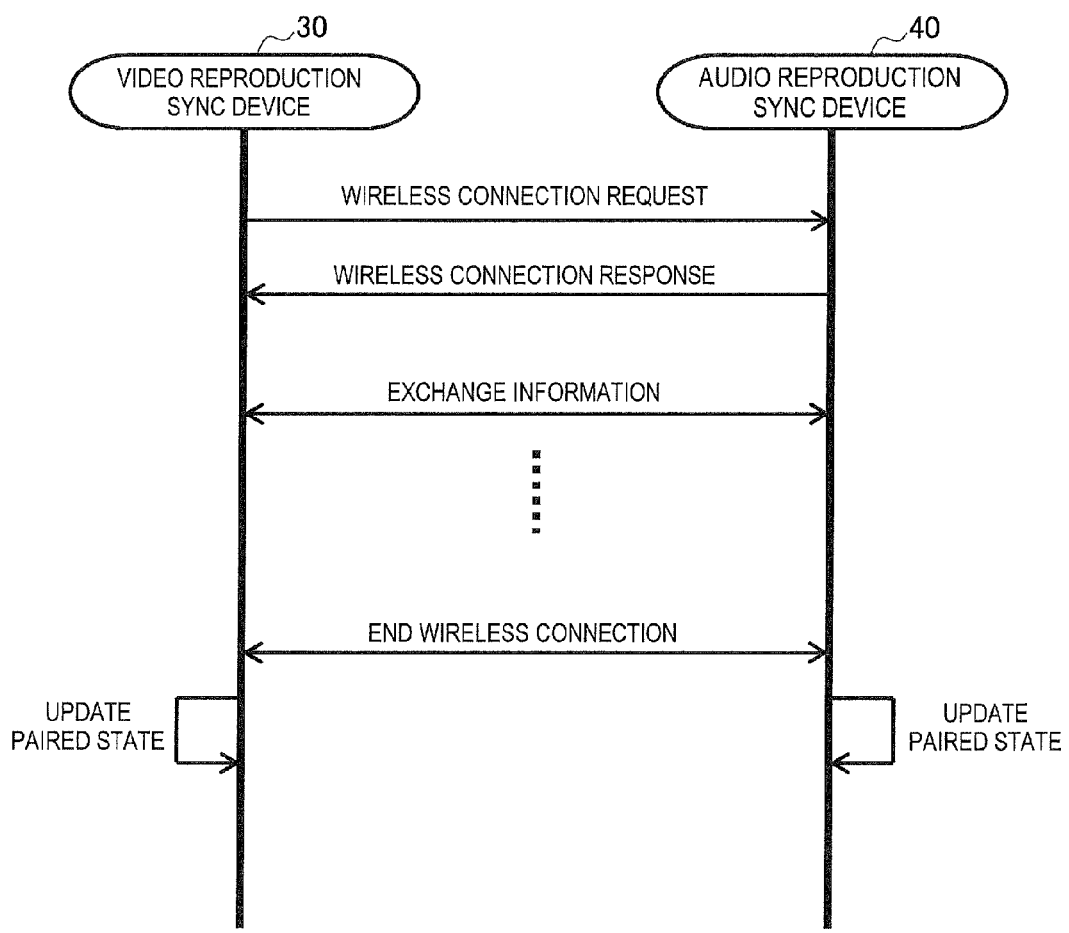
FIG. 13 is a sequence chart showing the procedure for a pairing process carried out to pair the video reproduction sync device with the audio reproduction sync device.

FIG. 13 shows the procedure carried out by the video reproduction sync device 30 for the pairing process with the audio reproduction sync device 40.

First, the video reproduction sync device 30 transmits a wireless connection request message to the audio reproduction sync device 40. Next, by having the audio reproduction sync device 40 send a wireless connection response message in reply, a wireless connection is established.

After this, the video reproduction sync device 30 and the audio reproduction sync device 40 exchange information that is used to reproduce the video data and the audio data from the same source device in a paired manner, such as reproduction formats and delay periods respectively corresponding to the video reproduction sync device 30 and the audio reproduction sync device 40. Next, the video reproduction sync device 30 and the audio reproduction sync device 40 become paired by recording the exchanged information and information on the other device with which exchange has been performed.

When the pairing process has been completed, the video reproduction sync device 30 and the audio reproduction sync device 40 end the wireless connection. As described earlier, when video data and audio data are transmitted from the source device 20, the video reproduction sync device 30 and the audio reproduction sync device 40 are not wirelessly connected to each other.

From this time onwards, by carrying out device discovery or the like (via a probe request and probe response), the video reproduction sync device 30 and the audio reproduction sync device 40 notify other devices who are exchanging information that they are paired devices.

Figure 14:
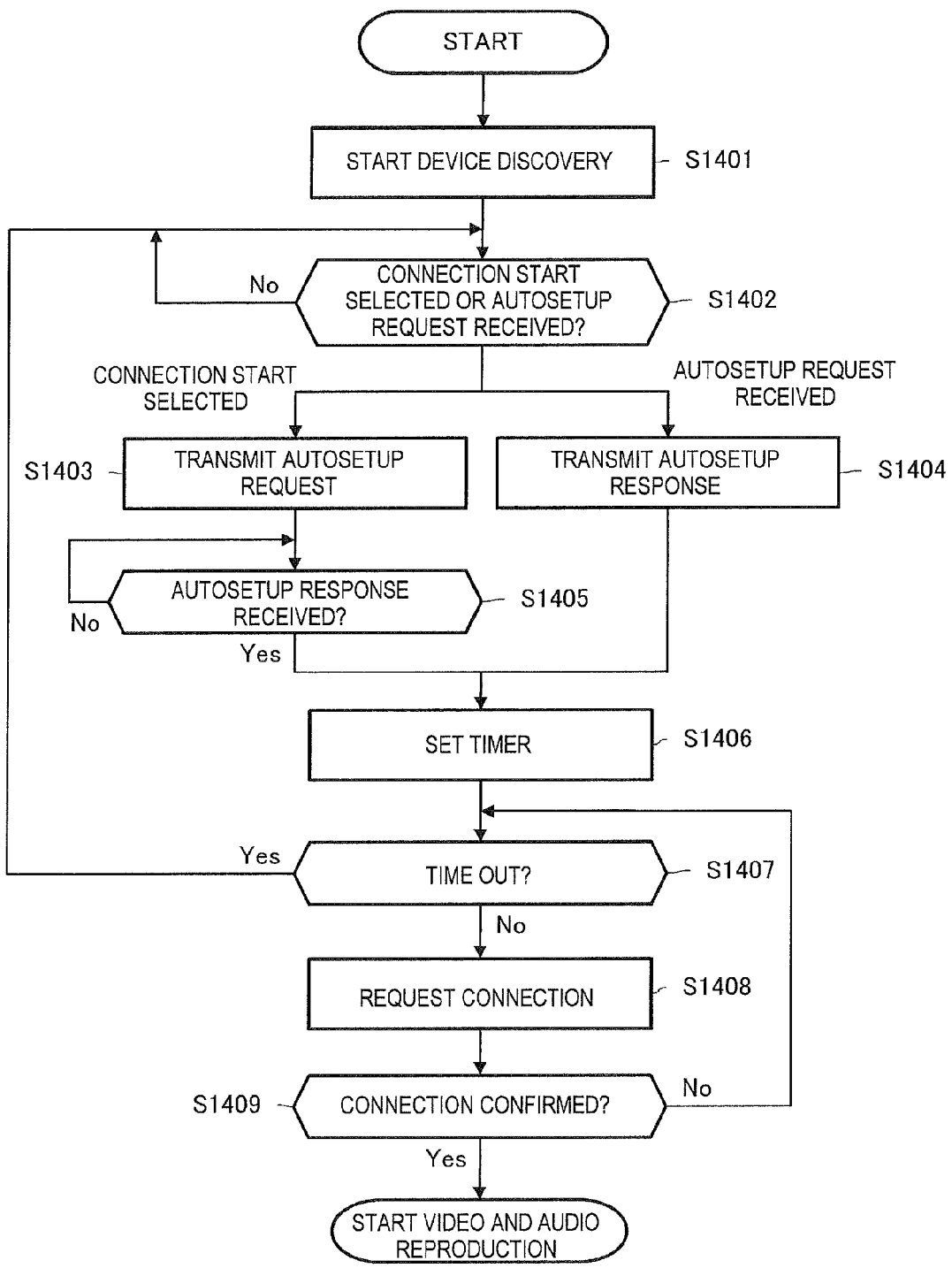
FIG. 14 is a flowchart showing the processing procedure carried out by the source device.

FIG. 14 shows, in the form of a flowchart, the processing procedure executed by the source device 20 to realize the communication sequence shown in FIG. 2 in the communication system 10 shown in FIG. 1.

After device discovery starts (step S1401), the source device 20 then proceeds to the autosetup request/autosetup response phase. If a user is operating the source device 20, the user is urged to select devices and start the connection process using the UI screen shown in FIG. 6, or the source device 20 stands by until an autosetup request is received from one of the sync devices 30, 40 (step S1402).

When a connection start has been requested in the UI screen (see FIG. 6) of the source device 20, an autosetup request is transmitted to the video reproduction sync device (step S1403) and then reception of the autosetup response from the video reproduction sync device 30 is awaited (step S1405).

Also, when an autosetup request has been received from either of the video reproduction sync device 30 and the audio reproduction sync device 40, the source device 20 sends an autosetup response in reply (step S1404).

Next, the source device 20 sets a timer that waits for wireless connections to be established with the video reproduction sync device 30 and the audio reproduction sync device 40 (step S1406). More specifically, the source device 20 sets a timer that waits for wireless connections for the longer time out of the expected times written in the autosetup request and the autosetup response message received from the video reproduction sync device 30 or the audio reproduction sync device 40.

After this, until the timer times out ("No" in step S1407), the source device 20 requests establishment of a wireless connection with each of the video reproduction sync device 30 and the audio reproduction sync device 40 (step S1408). When it has been possible to confirm connections with the sync devices 30, 40 before timing out ("Yes" in step S1409), the source device 20 ends the present processing. The source device 20 then establishes wireless connections with the video reproduction sync device 30 and the audio reproduction sync device 40 to form a star network and reproduction of video and audio starts.

On the other hand, when it has not been possible to confirm connections with the sync devices 30, 40 before timing out ("No" in step S1409, "No" in step S1407), the source device 20 determines that a problem has occurred and returns to the state before the autosetup started, that is, to step S1402. As a result, the device selection made in the UI screen shown in FIG. 6 is cancelled.

Figure 15:
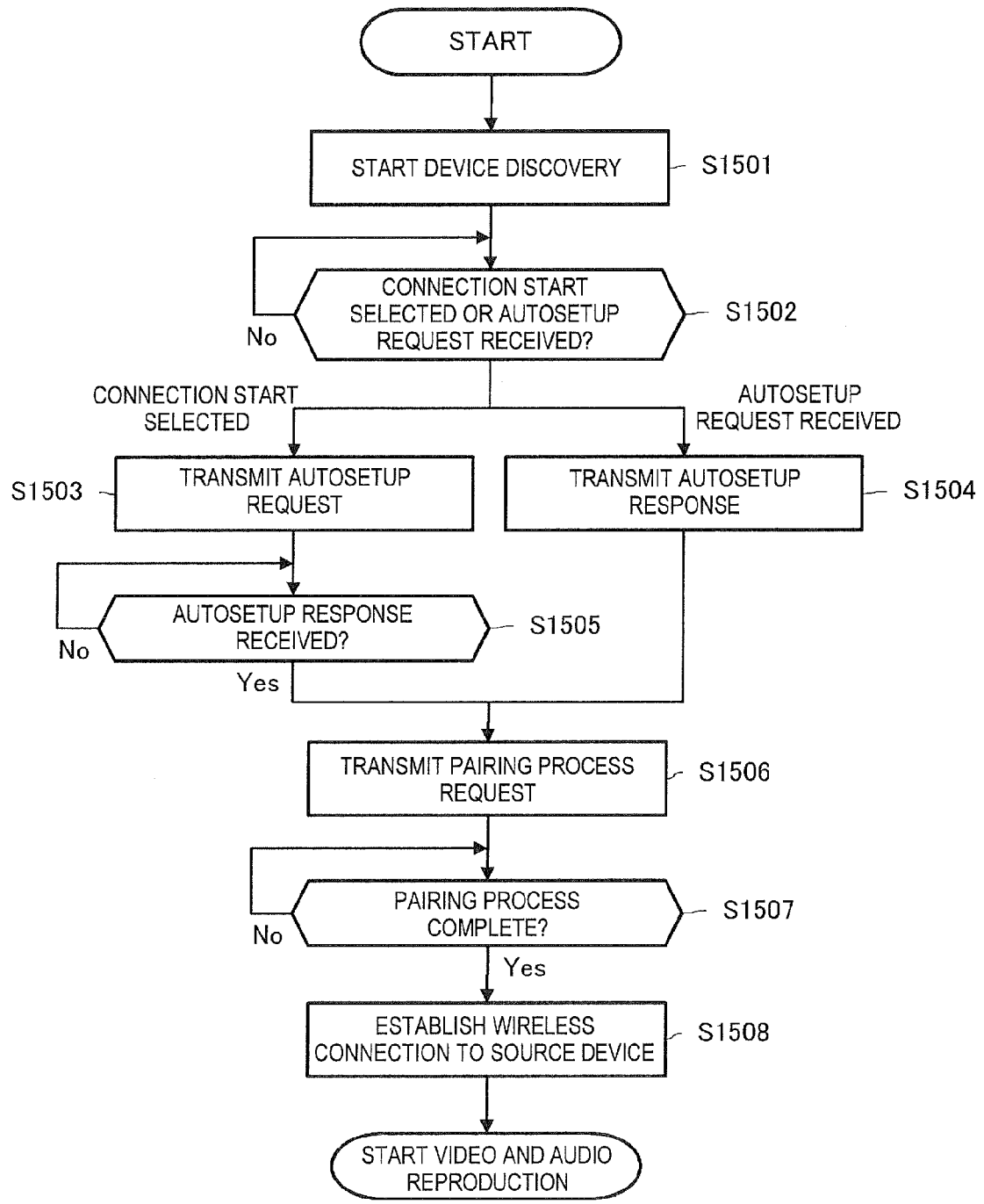
FIG. 15 is a flowchart showing the processing procedure carried out by the video reproduction sync device.

FIG. 15 shows, in the form of a flowchart, the processing procedure executed by the video reproduction sync device 30 to realize the communication sequence shown in FIG. 2 in the communication system 10 shown in FIG. 1.

After device discovery starts (step S1501), the video reproduction sync device 30 then proceeds to the autosetup request/autosetup response phase. After this, if the user is operating the video reproduction sync device 30, the user is urged to select devices and start the connection process using the UI screen shown in FIG. 8, or the video reproduction sync device 30 stands by until an autosetup request is received from one of the source device 20 and the audio reproduction sync device 40 (step S1502).

When a connection start has been requested in the UI screen (see FIG. 8) of the video reproduction sync device 30, an autosetup request is transmitted to the source device (step S1503) and then reception of the autosetup response from the source device 20 is awaited (step S1505).

Next, the video reproduction sync device 30 transmits a pairing process request to the audio reproduction sync device 40 selected on the UI screen (see FIG. 8) (step S1506). The procedure of the pairing process is as shown in FIG. 13 and is carried out via a wireless connection using Wi-Fi Direct technology, for example.

Once the pairing process has ended ("Yes" in step S1507), the wireless connection between the video reproduction sync device 30 and the audio reproduction sync device 40 is cut off. After this, the video reproduction sync device 30 establishes a wireless connection with the source device 20 (step S1508), a star-shaped network is formed as shown in FIG. 1, and reproduction of video and audio starts.

Figure 16:
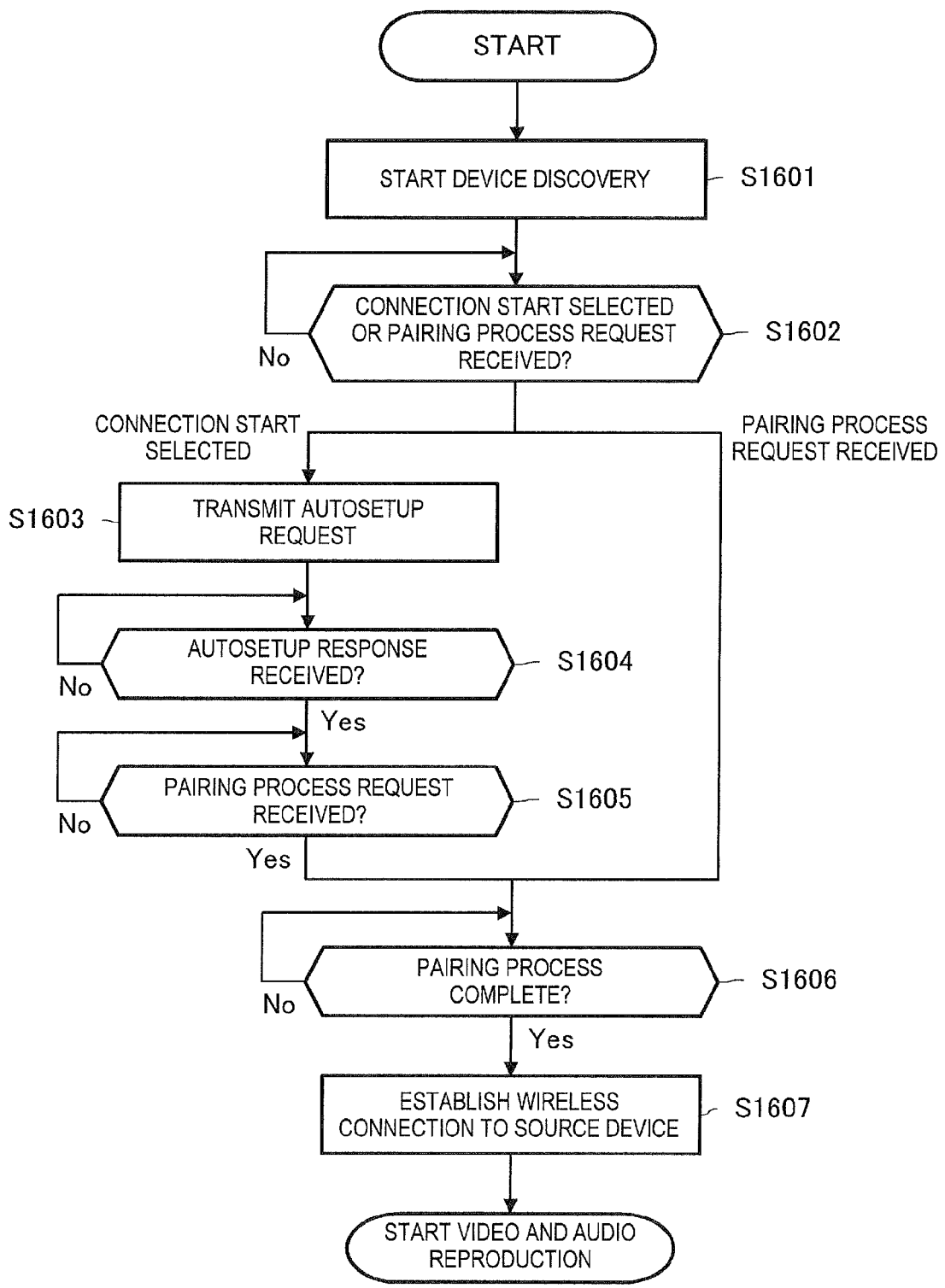
FIG. 16 is a flowchart showing the processing procedure carried out by the audio reproduction sync device.

FIG. 16 shows, in the form of a flowchart, the processing procedure executed by the audio reproduction sync device 40 to realize the communication sequence shown in FIG. 2 in the communication system 10 shown in FIG. 1.

After device discovery starts (step S1601), the audio reproduction sync device 40 then proceeds to the autosetup request/autosetup response phase. After this, if the user is operating the audio reproduction sync device 40, the user is urged to select devices and start the connection process using the UI screen shown in FIG. 8, or the audio reproduction sync device 40 stands by until a pairing process request is received from the video reproduction sync device 30 (step S1602).

When a connection start has been requested in the UI screen (see FIG. 10) of the audio reproduction sync device 40, after an autosetup request has been transmitted to the source device 20 and the video reproduction sync device 30 selected in the UI screen (see FIG. 8) (step S1603), the audio reproduction sync device 40 waits for an autosetup response to be received from both the source device 20 and the video reproduction sync device 30 ("No" in step S1604).

After this, when an autosetup response has been received from each of the source device 20 and the video reproduction sync device 30 ("Yes" in step S1604), the audio reproduction sync device 40 waits for a pairing process request to be received from the video reproduction sync device selected on the UI screen (see FIG. 8) ("No" in step S1605).

When a pairing processing request has been received from the video reproduction sync device 30 (step S1602, "Yes" in S1605) and the pairing process has ended ("Yes" in step S1606), the wireless connection between the video reproduction sync device 30 and the audio reproduction sync device 40 is cut off. After this, the audio reproduction sync device 40 establishes a wireless connection with the source device 20 (step S1607), a star-shaped network is formed as shown in FIG. 1, and reproduction of video and audio starts.

In this way, in the communication system 10 shown in FIG. 1, by operating one device out of the source device 20, the video reproduction sync device 30, and the audio reproduction sync device 40, the user is capable of connecting the source device and the respective sync devices. It is also possible to carry out the pairing process between the video reproduction sync device 30 and the audio reproduction sync device 40 automatically and to grasp the time taken before the system can be used.

Additionally, the technology disclosed in the present specification can also be configured as below.

(1) A communication apparatus including:
a device detecting unit detecting devices capable of establishing a wireless connection;
a user input unit selecting, based on a user operation, a combination of sync devices to carry out a pairing process out of a plurality of sync devices detected by the device detecting unit;
a message transmitting unit transmitting an autosetup request message to one sync device out of the selected sync devices;
a message receiving unit receiving an autosetup response message from a transmission destination of the autosetup request message;
a wireless connection unit establishing a wireless connection with each of the selected sync devices; and
a reproduction starting unit wirelessly transmitting, as a source device, data to be reproduced to each of the sync devices after establishment of the wireless connections.

(2) A communication apparatus according to (1),
wherein the plurality of sync devices include a video reproduction sync device equipped with a reproduction function for video data and an audio reproduction sync device equipped with a reproduction function for audio data,
the message transmitting unit transmits the autosetup request message to the video reproduction sync device out of the video reproduction sync device and the audio reproduction sync device selected as the combination of devices to carry out the pairing process, and
the reproduction starting unit wirelessly transmits video data and audio data to the video reproduction sync device and the audio reproduction sync device, respectively.

(3) A communication apparatus according to (1),
wherein the autosetup request message includes identification information on the present communication device operating as the source device and on the selected sync devices.

(4) A communication apparatus according to (1),
wherein the autosetup request message and the autosetup response message each include an expected time within which a transmitter of the message expects to complete establishment of a wireless connection,
the communication apparatus further includes a timer setting unit setting a timer based on the expected times written in the autosetup request message and the autosetup response message, and
the user input unit is operable when the timer has timed out, to cancel the combination of sync devices to carry out a pairing process that were selected based on the user operation.

(5) A communication method including:
detecting devices capable of establishing a wireless connection;
selecting, based on a user operation, a combination of sync devices to carry out a pairing process out of a plurality of detected sync devices;
transmitting an autosetup request message to one sync device out of the selected sync devices;
receiving an autosetup response message from a transmission destination of the autosetup request message;
establishing a wireless connection with each of the selected sync devices; and
wirelessly transmitting, as a source device, data to be reproduced to each of the sync devices after establishment of the wireless connections.

(6) A communication apparatus including:
a device detecting unit detecting devices capable of establishing a wireless connection;
a user input unit selecting, based on a user operation, a source device that is a supplier of data and a sync device to be paired with the communication apparatus out of a plurality of devices detected by the device detecting unit;
a message transmitting unit transmitting an autosetup request message to the selected source device;
a message receiving unit receiving an autosetup response message from the source device to which the autosetup request message was transmitted;
a pairing processing unit carrying out a pairing process with the selected sync device to be paired with the communication apparatus;
a wireless connection unit establishing a wireless connection with the selected source device; and
a reproduction starting unit receiving, as a sync device, data from the selected source device after establishment of the wireless connection and carrying out a reproduction process.

(7) A communication apparatus according to (6),
wherein the communication apparatus is a video reproduction sync device equipped with a reproduction function for video data and the sync device to be paired with the communication apparatus is an audio reproduction sync device equipped with a reproduction function for audio data, and
the reproduction starting unit receives video data from the source device and carries out the reproduction process.

(8) A communication apparatus according to (6),
wherein the autosetup request message includes identification information on the source device, on the present communication device operating as a sync device, and on the selected sync device to be paired with the communication apparatus.

(9) A communication apparatus according to (6),
wherein the autosetup request message and the autosetup response message each include an expected time within which a transmitter of the message expects to complete establishment of a wireless connection.

(10) A communication apparatus according to (6),
wherein the pairing processing unit requests establishment of a wireless connection with the selected sync device to be paired with the communication apparatus and exchanges information used for pairing via the wireless connection before storing a paired state with the selected sync device to be paired with the communication apparatus.

(11) A communication method including:
detecting devices capable of establishing a wireless connection;
selecting, based on a user operation, a source device that is a supplier of data and a sync device to be paired with out of a plurality of detected devices;
transmitting an autosetup request message to the selected source device;
receiving an autosetup response message from the source device to which the autosetup request message was transmitted;
carrying out a pairing process with the selected sync device to be paired with;
establishing a wireless connection with the selected source device; and
receiving, as a sync device, data from the selected source device after establishment of the wireless connection and carrying out a reproduction process.

(12) A communication apparatus including:
a device detecting unit detecting devices capable of establishing a wireless connection;

an autosetup request message receiving unit receiving, from one of a source device and another device that operates as a sync device out of a plurality of devices detected by the device detecting unit, an autosetup request message including identification information on the source device and on the present communication apparatus and the other device that operate as sync devices;

an autosetup response message transmitting unit transmitting an autosetup request message to the other device;

a pairing processing unit carrying out a pairing process with the other device;

a wireless connection unit establishing a wireless connection with the source device identified from the identification information included in the autosetup request message; and a reproduction starting unit receiving data from the selected source device after establishment of the wireless connection and carrying out a reproduction process.

(13) A communication apparatus according to (12), wherein the communication apparatus is a video reproduction sync device equipped with a reproduction function for video data and the other device is an audio reproduction sync device equipped with a reproduction function for audio data, and the reproduction starting unit receives video data from the source device and carries out the reproduction process.

(14) A communication apparatus according to (12), wherein the pairing processing unit requests the other sync device to establish a wireless connection in response to reception of the autosetup request message from the other sync device, exchanges information used for pairing via the wireless connection, and then stores a paired state with the other device.

(15) A communication apparatus including:
a device detecting unit detecting devices capable of establishing a wireless connection;

a user input unit selecting, based on a user operation, a source device that is a supplier of data and a sync device to be paired with the communication apparatus out of a plurality of devices detected by the device detecting unit;

a message transmitting unit transmitting an autosetup request message to each of the selected source device and the sync device to be paired with the communication apparatus;

a message receiving unit receiving an autosetup response message from each of the selected source device and the sync device to be paired with the communication apparatus to which the autosetup request message was transmitted;

a pairing processing unit carrying out a pairing process with the selected sync device to be paired with the communication apparatus;

a wireless connection unit establishing a wireless connection with the selected source device; and a reproduction starting unit receiving, as a sync device, data from the selected source device after establishment of the wireless connection and carrying out a reproduction process.

(16) A communication apparatus according to (15), wherein the communication apparatus is an audio reproduction sync device equipped with a reproduction function for audio data and the sync device to be paired with the communication apparatus is a video reproduction sync device equipped with a reproduction function for video data, and the reproduction starting unit receives audio data from the source device and carries out the reproduction process.

(17) A communication apparatus according to (15), wherein the autosetup request message includes identification information on the source device, on the present communication device operating as a sync device, and on the selected sync device to be paired with the communication apparatus.

(18) A communication apparatus according to (15), wherein the autosetup request message and the autosetup response message each include an expected time within which a transmitter of the message expects to complete establishment of a wireless connection.

(19) A communication apparatus according to (15), wherein the pairing processing unit receives a wireless connection request from the sync device to which the autosetup request message was transmitted, exchanges information used for pairing via the wireless connection, and then stores a paired state with the sync device to be paired with the communication apparatus.

(20) A communication method including:
detecting devices capable of establishing a wireless connection;

selecting, based on a user operation, a source device that is a supplier of data and a sync device to be paired with out of a plurality of devices that have been detected;

transmitting an autosetup request message to each of the selected source device and the sync device to be paired with;

receiving an autosetup response message from each of the source device and the sync device to be paired with to which the autosetup request message was transmitted;

carrying out a pairing process with the selected sync device to be paired with;

establishing a wireless connection with the selected source device; and receiving, as a sync device, data from the selected source device after establishment of the wireless connection and carrying out a reproduction process.

(21) A communication system including:
a source device supplying data; and
a plurality of sync devices reproducing data received from the source device, wherein after a pairing process for the plurality of sync devices and establishment of wireless connections between the source device and each of the plurality of sync devices based on a user operation at one device out of the source device and the plurality of sync devices, data is transmitted from the source device to each of the plurality of sync devices and reproduction of the data by the plurality of sync devices starts.

It should be understood by those skilled in the art that various modifications, combinations, sub-combinations and alterations may occur depending on design requirements and other factors insofar as they are within the scope of the appended claims or the equivalents thereof.

Although an embodiment that follows the rules of Wi-Fi Direct technology has been described in the present specification, the technology disclosed in the present specification is not limited to such. It is also possible to apply the present disclosure in the same way to a variety of communication systems that are composed of one source device and a plurality of sync devices and have the respective sync devices carry out a reproduction process on data simultaneously transmitted from the source device.

In short, the present technology has been disclosed in a form of illustration and should not be interpreted limitedly. To determine the gist of the present disclosure, patent claims should be taken into account.

What is claimed is:
1. A first sink device for receiving one of video data or audio data from a source device and for reproducing signals corresponding thereto, said first sink device comprising:

a device detecting unit detecting devices capable of establishing a wireless connection;

a user input unit which enables a user to select the source device and a second sink device to be paired with the first sink device out of a plurality of devices detected by the device detecting unit, in which each of the devices from which the second sink device is selectable is directly connected to the selected source device;

a message transmitting unit transmitting an autosetup request message to the selected source device;

a message receiving unit receiving an autosetup response message from the source device to which the autosetup request message was transmitted;

a pairing processing unit carrying out a pairing process with the selected second sink device to be paired with the first sink device;

a wireless connection unit establishing a wireless connection with the selected source device; and a reproduction starting unit receiving data from the selected source device after establishment of the wireless connection and carrying out a reproduction process, in which the first sink device is directly connectable to the source device and the selected second sink device is directly connected to the selected source device, so as to enable the source device to provide the video or audio data directly to the first sink device and to provide the video or audio data directly to the second selected sink device, and in which the pairing process between the first sink device and the selected second sink device is enabled to be automatically performed after transmission of the autosetup request message to the selected source device by the first sink device which is the same sink as one of the paired sink devices such that the pairing process between the first sink device and the selected second sink device is performable by the user operating only the first sink device.

2. The first sink device according to claim 1, wherein the first sink device is a video reproduction sink device equipped with a reproduction function for video data and the second sink device to be paired therewith is an audio reproduction sink device equipped with a reproduction function for audio data, and the reproduction starting unit receives video data from the source device and carries out the reproduction process.

3. The first sink device according to claim 1, wherein the autosetup request message includes identification information on the source device, on the first sink device, and on the selected second sink device to be paired therewith.

4. The first sink device according to claim 1, wherein the autosetup request message and the autosetup response message each include an expected time within which a transmitter of the message expects to complete establishment of a wireless connection.

5. The first sink device according to claim 1, wherein the pairing processing unit requests establishment of a wireless connection with the selected second sink device and exchanges information used for pairing via the wireless connection before storing a paired state with the selected second sink device.

6. The first sink device according to claim 1, in which the first sink device is a television and the second sink device is a speaker.

7. A communication method for use with a first sink device for receiving one of video data or audio data from a source device and for reproducing signals corresponding thereto, said method comprising:

detecting devices capable of establishing a wireless connection;

selecting, based on an input from a user, the source device and a second sink device to be paired with the first sink device out of a plurality of detected devices, in which each of the devices from which the second sink device is selectable is directly connected to the selected source device;

transmitting an autosetup request message to the selected source device;

receiving an autosetup response message from the source device to which the autosetup request message was transmitted;

carrying out a pairing process with the selected second sink device to be paired with the first sink device;

establishing a wireless connection with the selected source device; and receiving data from the selected source device after establishment of the wireless connection and carrying out a reproduction process, in which each of the first sink device and the selected second device is directly connectable to the source device, so as to enable the source device to provide the video or audio data directly to the first sink device and directly to the second selected sink device, and in which the pairing process between the first sink device and the selected second sink device is enabled to be automatically performed after transmission of the autosetup request message to the selected source device by the first sink device which is the same sink as one of the paired sink devices such that the pairing process between the first sink device and the selected second sink device is performable by the user operating only the first sink device.

8. The method according to claim 7, in which the first sink device is a television and the second sink device is a speaker.

9. A first sink device for receiving one of video data or audio data from a source device and for reproducing signals corresponding thereto, said first sink device comprising:

a device detecting unit detecting devices capable of establishing a wireless connection;

an autosetup request message receiving unit receiving, from another sink device out of a plurality of devices detected by the device detecting unit, an autosetup request message including identification information on a source device and on the first sink device and the other device that operate as sink devices;

an autosetup response message transmitting unit transmitting an autosetup response message to the other device;

a pairing processing unit carrying out a pairing process with the other device and the first sink device so as to form paired sink devices;

a wireless connection unit establishing a wireless connection with the source device identified from the identification information included in the autosetup request message; and a reproduction starting unit receiving data from the selected source device after establishment of the wireless connection and carrying out a reproduction process, in which each of the first sink device and the other sink device is directly connectable to the source device, so as to enable the source device to provide the video or audio data directly to the first sink device and directly to the other sink device, and in which the pairing process between the first sink device and the other sink device is enabled to be automatically performed after transmission of the autosetup request message by the other sink device which is the same sink as one of the paired sink devices such that the pairing process between the first sink device and the other sink device is performable by the user operating only the other sink device.

10. The first sink device according to claim 9,
wherein the first sink device is a video reproduction sink device equipped with a reproduction function for video data and the other device is an audio reproduction sink device equipped with a reproduction function for audio data, and
the reproduction starting unit receives video data from the source device and carries out the reproduction process.

11. The first sink device according to claim 9,
wherein the pairing processing unit requests the other sink device to establish a wireless connection in response to reception of the autosetup request message from the other sink device, exchanges information used for pairing via the wireless connection, and then stores a paired state with the other device.

12. The first sink device according to claim 9, in which the first sink device is a television and the second sink device is a speaker.

13. A first sink device for receiving one of video data or audio data from a source device and for reproducing signals corresponding thereto, said first sink device comprising:
a device detecting unit detecting devices capable of establishing a wireless connection;
a user input unit to enable a user to select the source device and a second sink device to be paired with the first sink device out of a plurality of devices detected by the device detecting unit, in which each of the devices from which the second sink device is selectable is directly connected to the selected source device;
a message transmitting unit transmitting an autosetup request message to each of the selected source device and the second sink device to be paired with the first sink device;
a message receiving unit receiving an autosetup response message from each of the selected source device and the second sink device to be paired with the first sink device to which the autosetup request message was transmitted;
a pairing processing unit carrying out a pairing process with the selected second sink device to be paired with the first sink device;
a wireless connection unit establishing a wireless connection with the selected source device; and
a reproduction starting unit receiving data from the selected source device after establishment of the wireless connection and carrying out a reproduction process,
in which the first sink device is directly connectable to the source device and the selected second sink device is directly connected to the selected source device, so as to enable the source device to provide the video or audio data directly to the first sink device and to provide the video or audio data directly to the second selected sink device, and
in which the pairing process between the first sink device and the selected second sink device is enabled to be automatically performed after transmission of the autosetup request message to the selected source device and the second sink device by the first sink device which is the same sink as one of the paired sink devices such that the pairing process between the first sink device and the selected second sink device is performable by the user operating only the first sink device.

14. The first sink device according to claim 13,
wherein the first sink device is an audio reproduction sink device equipped with a reproduction function for audio data and the second sink device to be paired therewith is a video reproduction sink device equipped with a reproduction function for video data, and
the reproduction starting unit receives audio data from the source device and carries out the reproduction process.

15. The first sink device according to claim 13,
wherein the autosetup request message includes identification information on the source device, on the first sink device, and on the selected second sink device.

16. The first sink device according to claim 13,
wherein the autosetup request message and the autosetup response message each include an expected time within which a transmitter of the message expects to complete establishment of a wireless connection.

17. The first sink device according to claim 13, in which the first sink device is a television and the second sink device is a speaker.

* * * * *